United States Patent [19]
Cutler et al.

[11] Patent Number: 5,278,840
[45] Date of Patent: Jan. 11, 1994

[54] APPARATUS AND METHOD FOR DATA INDUCED CONDITION SIGNALLING

[75] Inventors: David N. Cutler, Bellevue; David A. Orbits, Redmond, both of Wash.; Dileep Bhandarkar, Shrewsbury, Mass.; Wayne Cardoza, Merrimack, N.H.; Richard T. Witek, Littleton, Mass.

[73] Assignee: Digital Equipment Corporation, Maynard, Mass.

[21] Appl. No.: 5,934

[22] Filed: Jan. 15, 1993

Related U.S. Application Data

[63] Continuation of Ser. No. 542,798, Jun. 19, 1990, abandoned, which is a continuation of Ser. No. 374,601, Jun. 30, 1989, abandoned, which is a continuation of Ser. No. 69,285, Jul. 1, 1987, abandoned.

[51] Int. Cl.5 .......................................... G06F 11/00
[52] U.S. Cl. ................................ 371/16.1; 371/29.1; 371/16.5
[58] Field of Search ............... 371/25.1, 29.1, 29.5, 371/20.1, 20.2, 20.3, 20.4, 20.5, 15.1, 16.1, 14.2, 16.5, 18, 25, 29, 16, 15, 20, 18; 364/200, 900, ; 395/575

[56] References Cited

U.S. PATENT DOCUMENTS

| | | | |
|---|---|---|---|
| 4,079,453 | 3/1978 | Dahl | 364/200 |
| 4,084,230 | 4/1978 | Matick | 364/200 |
| 4,100,605 | 7/1978 | Holman | 364/900 |
| 4,145,738 | 3/1979 | Inoue et al. | 364/200 |
| 4,167,781 | 9/1979 | Beccia et al. | 364/200 |
| 4,228,496 | 10/1980 | Katzman et al. | 364/200 |
| 4,320,466 | 3/1982 | Myers | 364/200 |
| 4,334,268 | 6/1982 | Boney et al. | 364/200 |
| 4,438,512 | 3/1984 | Hartung et al. | 371/60 |
| 4,451,885 | 5/1984 | Gerson et al. | 364/200 |
| 4,592,053 | 5/1986 | Matsuura | 371/29 |
| 4,593,391 | 6/1986 | Mizushima | 371/29 |
| 4,679,195 | 7/1987 | Dewey | 371/29 |
| 4,685,053 | 8/1987 | Hattori | 371/29 |
| 4,745,602 | 5/1988 | Morrell | 371/29 |

FOREIGN PATENT DOCUMENTS 1093214 1/1981 Canada .
0130381 1/1985 European Pat. Off. ........ G06F 9/30

OTHER PUBLICATIONS

Radin, "The 801 Minicomputer", *Sigarch,* vol. 10, No. 2, (1982), pp. 39–47.
Lutter, "Shift Register Verifier", *IBM Technical Disclosure Bulletin,* vol. 19, No. 12, (1977).
Auslander, et al., "An Overview of the PL.8 Compiler", *ACM SIGPLAN Notices,* vol. 17, No. 6, (1982), pp. 22–31.
Nelson, "Check Array Boundaries," 386, (1988), p. 15.
"Applications Instruction Set," *The Intel 80386 Programmer's Reference Manual,* (1987), pp. 3–24, 3–25.
"80386 Instruction Set," *The Intel 80386 Programmer's Reference Manual,* (1987), pp. 17–26, 17–27.
Motorola, Inc.; MC68020 32-Bit Microprocessor User's Manual Second Edition; MC68020 The 32-Bit Performance Standard; pp. A-1-9-28.
System Considerations in the Design of the AM29000; Mike Johnson, Advanced Micro Devices; Aug. 1987.

*Primary Examiner*—Robert W. Beausoliel, Jr.
*Assistant Examiner*—Ly V. Hua
*Attorney, Agent, or Firm*—Fish & Richardson

[57] ABSTRACT

In a data processing system, an instruction is disclosed that generates a fault when a predetermined register position (e.g., the low or least significant bit position) has a predetermined logic signal (e.g., a logic '0' signal). This instruction provides a mechanism to determine when a Boolean value indicates a presence of a fault condition and provides a mechanism to generate the fault when present. For example, in arrays of memory locations that can be addressed by a program, this instruction can respond to the presence of an array address (or reference) that is outside the prescribed bounds of the array. When an invalid address is identified, a signal is entered in the low (i.e., least significant) bit position of a processor scalar register. The instruction repertoire includes a Fault on Low Bit Clear instruction that tests the contents of the scalar register low bit position, and when a logic '0' signal is found therein, an exception signal is generated and applied to the control program of the data processing system.

20 Claims, 4 Drawing Sheets

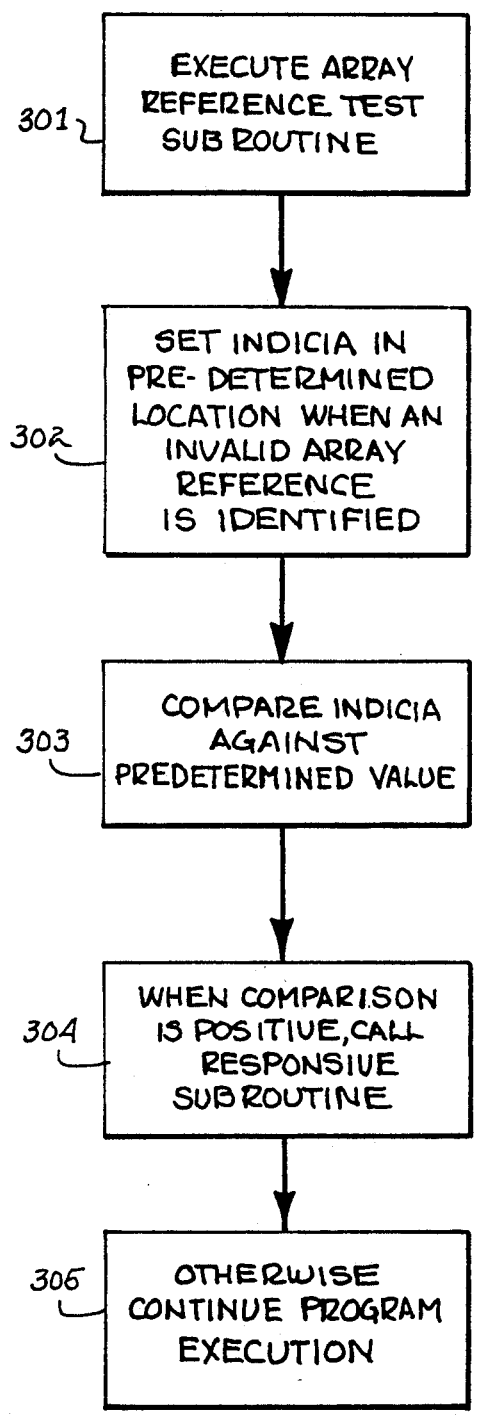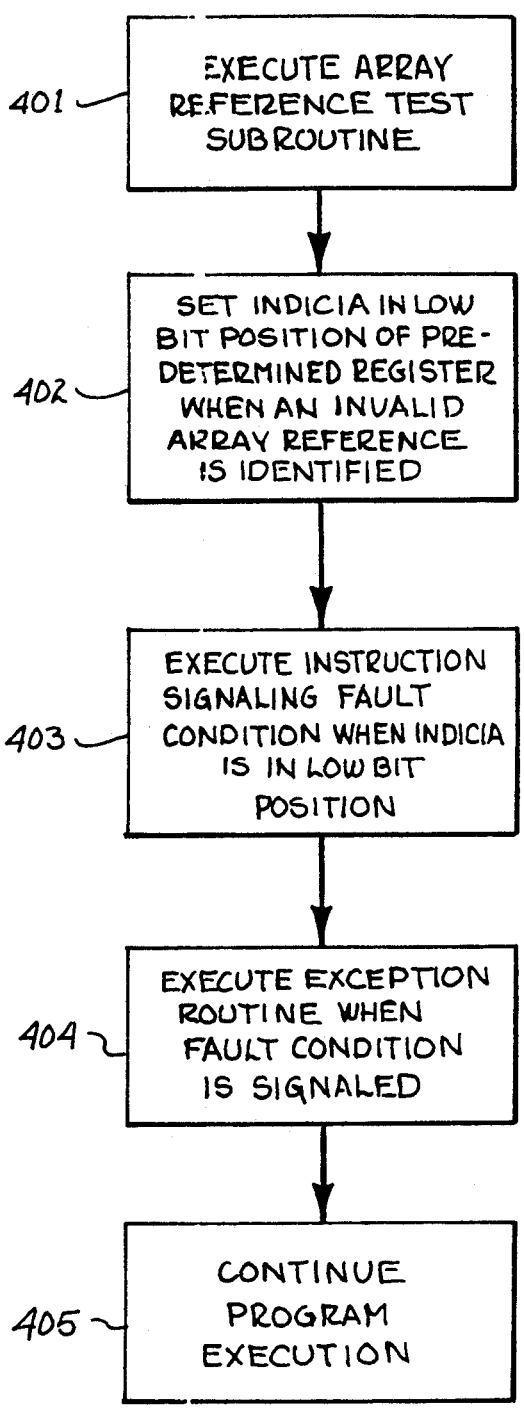
fig. 3 PRIOR ART
fig. 4

APPARATUS AND METHOD FOR DATA INDUCED CONDITION SIGNALLING

This is a continuation of application Ser. No. 07/542,798, filed Jun. 19, 1990, now abandoned, which is a continuation of application Ser. No. 07/374,601, filed Jun. 30, 1989, now abandoned, which is a continuation of application Ser. No. 07/069,285, filed Jul. 1, 1987, now abandoned.

RELATED APPLICATIONS

This application is related to the following U.S. Patent Applications.

Apparatus and Method for Synchronization of Arithmetic Exceptions in Central Processing Units Having Pipelined Execution Units Simultaneosly Executing Instructions invented by David N. Cutler, David A. Orbits, Dileep Bhandarkar, Wayne Cardoza and Richard T. Witek; having Ser. No. 028,248; filed on Mar. 7, 1987 and assigned to the assignee of the present U.S. Patent Application.

Apparatus and Method for Recovering from Missing Page Faults in Vector Data Processing Operations invented by David N. Cutler, David A. Orbits, Dileep Bhandarkar, Wayne Cardoza and Richard T. Witek; having Ser. No. 069,372; filed on Jul. 1, 1987 and assigned to the assignee of the present U.s. Patent Application.

Apparatus and Method for Providing an Extended Processing Environment for Nonmicrocoded Data Processing Systems invented by David N. Cutler, David A. Orbits, Dileep Bhandarkar, Wayne Cardoza and Richard T. Witek; having Ser. No. 069,365; filed on Jul. 1, 1987 and assigned to the assignee of the present U.S. Patent Application.

Apparatus and Method for Main Memory Unit Protection using Access and Fault Logic Signals invented by David N. Cutler, David A. Orbits, Dileep Bhandarkar, Wayne Cardoza and Richard T. Witek; having Ser. No. 069,290; filed on Jul. 1, 1987 and assigned to the assignee of the present U.S. Patent Application.

Apparatus and Method for Control of Asynchronous Program Interrupt Events in a Data Processing System invented by David N. Culter, David A. Orbits, Dileep Bhandarkar, Wayne Cardoza and Richard T. Witek; having Ser. No. 069,430; filed on Jul. 1, 1987 and assigned to the assignee of the present U.S. Patent Application.

Apparatus and Method for Synchronization of Access to Main Memory Signal Groups in a Multi-processing Unit Data Processing System invented by David N. Culter, David A. Orbits, Dileep Bhandarkar, Wayne Cardoza and Richard T. Witek; having Ser. No. 069,380; filed on Jul. 1, 1987 and assigned to the assignee of the present U.S. Patent Application.

BACKGROUND OF THE INVENTION

1. Field of the Invention

This invention relates generally to data processing systems and, more particularly, to a technique in a data processing system for efficiently invoking a control program based on a predetermined signal in a specified register location.

2. Description of the Related Art

As data processing system programs have become larger and more complex, errors in the program have become increasingly hard to identify. The invalid memory reference remains one of the most common programming errors whether reading or writing an invalid address. For example, an array A(i,j) can have the requirement that $0 \leq i,j \leq 99$. However, an attempt can be made to utilize an index (address) outside of this range. And the invalid address reference most often occurs when the referenced address is part of an array field. Therefore, during program execution, it is important that array addresses be tested to insure that they are within the boundaries of the array. In the past, the program has been provided with extra code to test the array addresses and, when an error, is encountered to call an appropriate responsive subroutine. The additional code for the testing of the array addresses has resulted in programs that are greatly increased in size and which execute at a correspondingly slower rate.

The problem of the testing of array addresses is part of a more general problem of testing a Boolean value and generating an exception when the result is false. Other applications, in addition to the testing of array addresses, include program assertion, testing for procedure success/failure return status and other Boolean tests for which current procedures involve unacceptable program (code) size and/or inefficient program execution.

A need has been felt for a technique that can expedite execution and reduce the program code (size) for programs, such as a program which tests array addresses, that can test Boolean values and generate an exception when the Boolean value is false.

FEATURES OF THE INVENTION

It is an object of the present invention to provide an improved data processing unit.

It is a feature of the present invention to provide an improved method of efficiently invoking a control program based on a predetermined signal in a specified register location.

It is still another feature of the present invention to provide a Fault on Low Bit instruction, the presence of a signal in the low bit field of a register indicating detection of a false Boolean value.

It is a further feature of the present invention to test a Boolean condition by determining the presence of a particular bit in register location.

SUMMARY OF THE INVENTION

The aforementioned and other objects are accomplished, according to the present invention, by providing a data processing system with a Fault on Low Bit Clear (FLBC) instruction. Prior to execution of this instruction, a comparison operation is executed to generate a Boolean value. The comparison operation sets or clears the low bit in a specified scalar register, determined by the validity of the comparison operation. In the FLBC instruction, the selected register is tested and if a false Boolean value is found stored therein, the presence of a fault condition is signaled to a fault control program. This instruction eliminates the need for a branch around a code sequence that results in a call to an error subroutine specifying the condition resulting in the false Boolean value. In the preferred embodiment, the FLBC instruction is selected so that a field of the instruction can be used to pass information to the fault control program. This instruction results in faster execution time (no branch around subroutine call) and less program code is required to provide the operation. The impact of this single instruction on the program execution time is minimal, permitting for example greater use of the array address checking. Apparatus is provided to supply the data processing unit issue unit with a copy of the register bit so that the register bit location can be checked without use of an execution unit.

These and other features of the present invention will be understood upon reading of the following description along with the drawings.

BRIEF DESCRIPTION OF THE DRAWINGS

FIG. 3 is an example of the technique for testing array references according to the prior art.

FIG. 4 illustrates the testing of array references according to the present invention.

DESCRIPTION OF THE PREFERRED EMBODIMENT

1. Detailed Description of the Figures

Figure 1A:
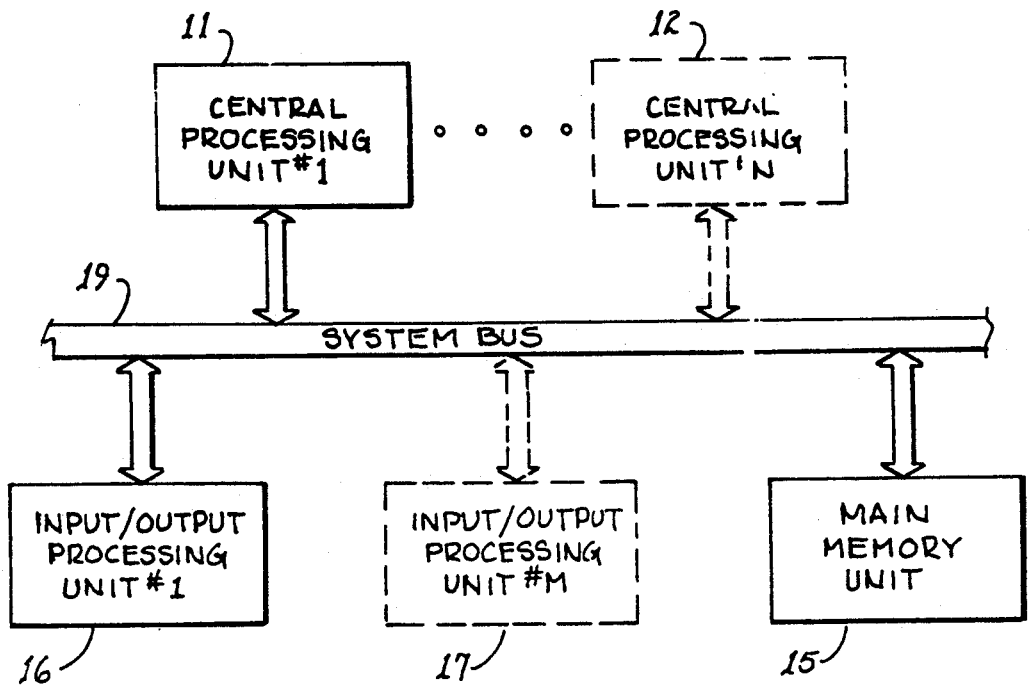
FIG. 1A and FIG. 1B are examples of data processing system implementations capable of using the present invention.
Figure 1B:
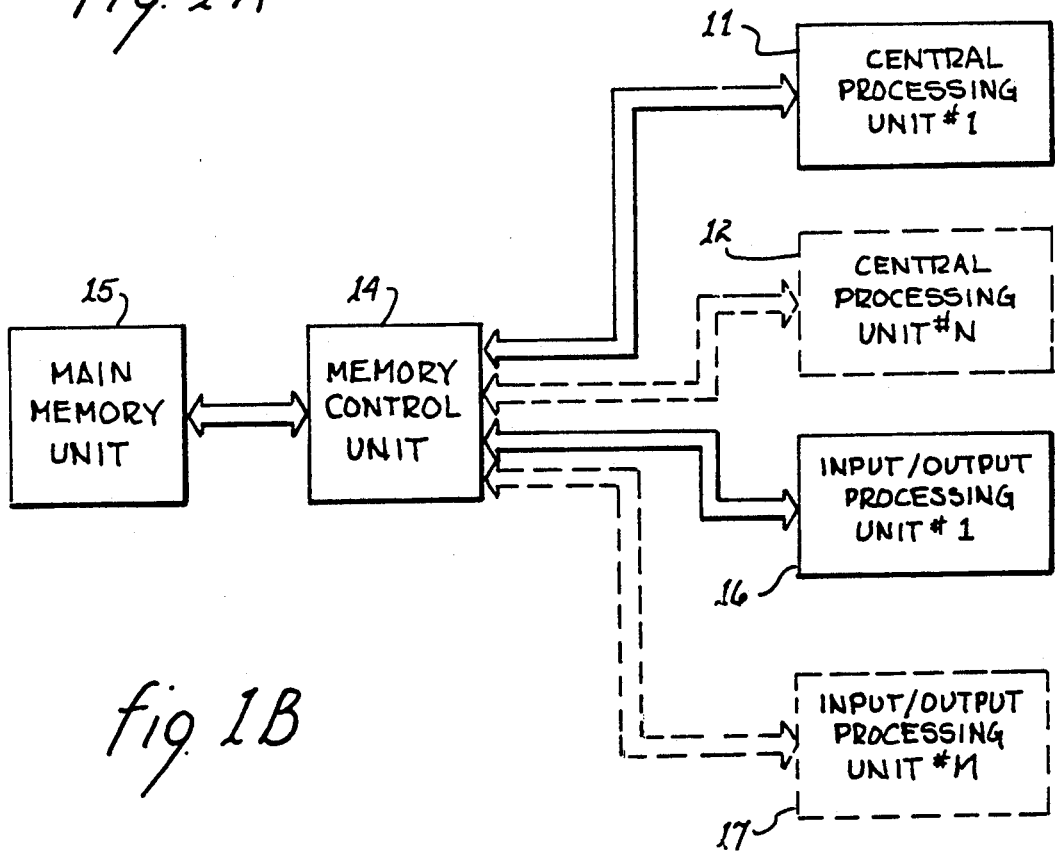

Referring now to FIG. 1A and FIG. 1B, two exemplary data processing system configurations capable of using the present invention are shown. In FIG. 1A, the central processing unit (#1) 11 is coupled to a system bus 19. Other central processing units (e.g., #N) 12 can also be coupled to the system. The central processing unit(s) 11 (through 12) process data according to the structure of the central processing unit(s) in conjunction with central processing unit control programs, the control programs being comprised of instructions resident in the main memory unit 15. The nonresident data and instructions are typically stored in the mass storage unit(s) and are transferred to and from the main memory unit 15 via the system bus 19. Input/output unit(s) {#1} 16 (through {#M} 17) couple devices such as mass memory storage units, user terminal devices and communication devices to the data processing system by means of the system bus 19. The mass storage units store the data and instructions required by the data processing unit(s). Sets of data and/or instructions, typically designated as pages of data and/or instructions, required for the operation of the central processing units 11 through 12, are transferred from the mass storage units, having relatively slow accessibility, to the main memory unit to which access by the central processing unit is relatively fast. The bus oriented system has an advantage in the relative ease to reconfigure the system but has the disadvantage that the each system component requires control apparatus to provide an interface with the system bus. Referring next to FIG. 1B, a data processing system is shown in which the central processing unit(s) 11 (through 12) and the input-/output unit(s) 16 (through 17) are coupled to the main memory unit 15 through a memory control unit 14, the memory control unit 14 replacing the system bus 19 and the control function performed by individual data processing system components in the bus oriented data processing configuration shown in FIG. 1A. The memory control unit 14 provides a centralized control and monitoring of the transfer of data and instructions that can be more efficient than the bus oriented configuration of FIG. 1, but with the loss of flexibility.

Figure 2:
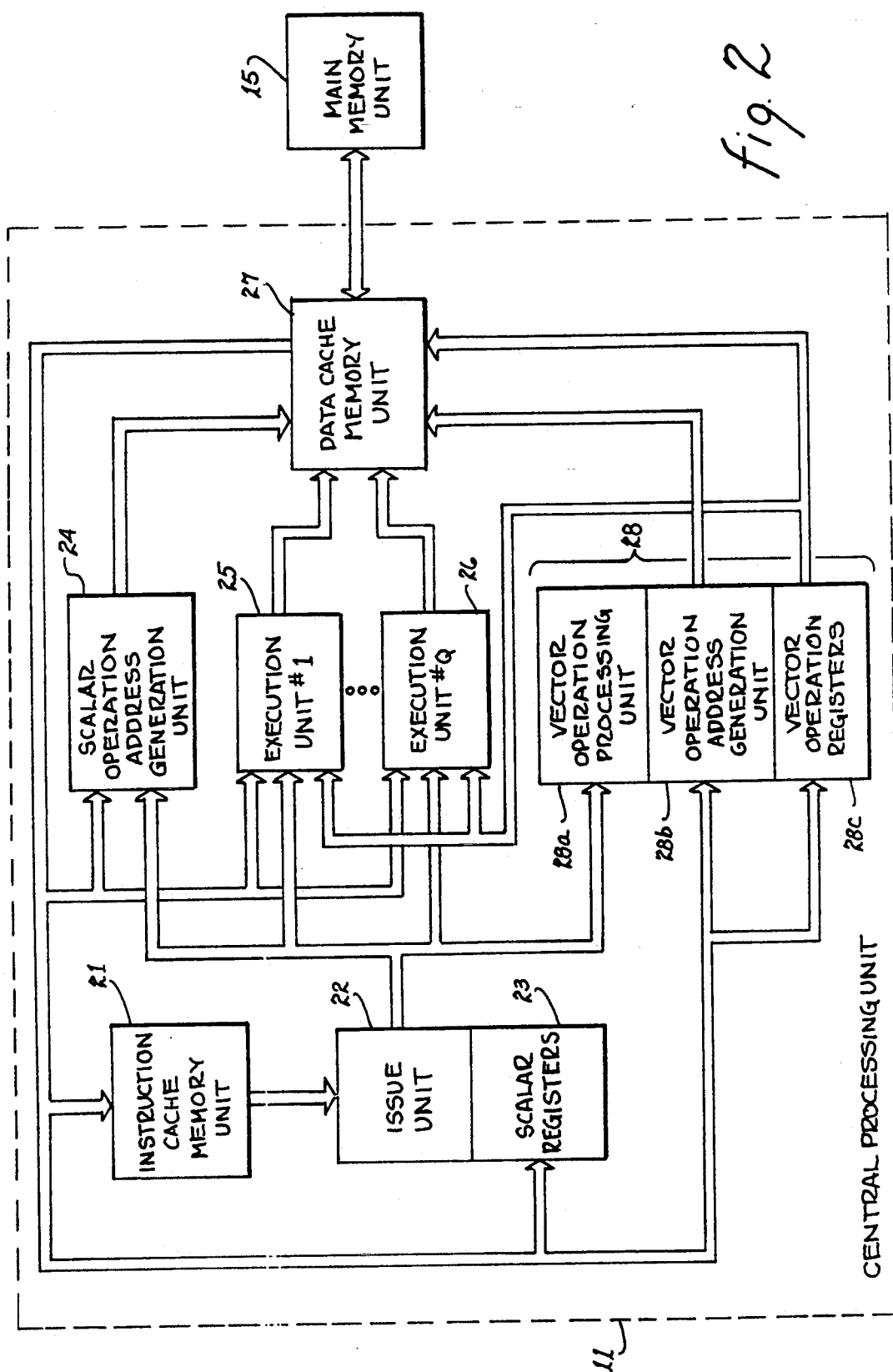
FIG. 2 is an example of a central processing unit of a data processing unit capable of using the present invention.

Referring next to FIG. 2, a block diagram of an exemplary central processing unit capable of effective utilization of the present invention is illustrated. The issue unit 22 is responsible for for providing (decoded) instructions to the plurality of specialized execution units comprising scalar operation address generation unit 24, at least one execution unit (#1) 25 (through execution unit {#Q} 26) and a vector operation unit 28, the vector operation unit 28 including vector operation processing unit 28A, vector operation address generation unit 28B and vector operation registers 28C. The data processed by the execution units are typically extracted from the scalar registers 23 or the vector registers 28C. The resulting data from the execution units are stored in the scalar registers 23, in the vector registers 28C or in the data cache memory unit 27. The data cache memory unit 27 can be viewed as a cache memory unit providing an interface between the main memory unit 15 and the central processing unit 11. (The data cache memory unit 27 is shown as being coupled directly to the main memory unit in FIG. 2. As illustrated in FIG. 1A and FIG. 1B, the actual coupling can include intervening data processing apparatus.) The issue unit 22 includes apparatus for determining which execution unit will process selected data and for determining when the selected execution unit is available for processing data. This latter feature includes ascertaining that the destination storage location will be available to store the processed data. The instruction cache memory unit 21 stores the instructions that are decoded and forwarded to the appropriate execution unit by the issue unit. The issue unit 22 has the apparatus to attempt to maximize the processing operations of the execution units. Thus, the issue unit 22 includes prefetch apparatus and algorithms to ensure that the appropriate instruction (including any branch instruction) is available to the issue unit 22 as needed. The plurality of execution units are, as indicated by the scalar operation address generation unit 24 and the vector operation unit 28, specialized processing devices for handling certain classes of processing operation. For example, an execution unit can be configured to handle floating point operations, or integer arithmetic operations, etc. The issue unit 22 has associated therewith scalar registers 23 that can store data required for the execution of the program or for providing a record of the data processing operation. For example, one register is the Program Counter register that stores the (virtual) address of the next instruction, in the executing program instruction sequence, to be processed. The scalar operation address generation unit 24 is used to convert virtual addresses to physical locations in the main memory unit 15. The issue unit 22 is also responsible for reordering the data from the execution units in the correct sequence when the execution units process instructions at different rates.

Referring next to FIG. 3, the procedure for testing for and responding to a Boolean condition, according to the prior art, is illustrated in terms of an invalid array index (address). In step 301, an array index is calculated. In step 302, the calculated array index is compared with the bounds for all array indexes, and when the index is not within the permissible bounds, the low bit position of a specified register is cleared (i.e., a logic "0" signal is stored therein. In step 303, the low bit position of the specified register is tested to determine if a logic '1' signal is stored therein. When a logic '1' signal is not stored therein (i.e., the low bit position is clear), a subroutine is called to respond to the condition in step 304. After the fault condition has been responded to, or when the low bit position has a logic '1' signal stored therein, then the program continues execution.

Referring to FIG. 4, the procedure for testing and responding to the Boolean condition, according to the present invention, is illustrated in terms of the an array index checking routine (as in FIG. 3). In step 401, the array index is calculated. In step 402, a comparison is made to determine if the index is within the boundaries for array indexes and when the index is not within the permissible bounds, a logic '0' is stored in the low bit position of a specified register. In step 403, the Fault on Low Bit Clear (FLBC) instruction is executed. When the low bit position of the specified register is clear (i.e., has a logic '0' signal stored therein, then a fault is signaled and a responsive subroutine is executed in step 404. When the low bit position of the specified register has logic '1' stored therein in step 403 or at the conclusion of responsive subroutine in step 404, the execution of the program continues in step 405.

Figure 5A:
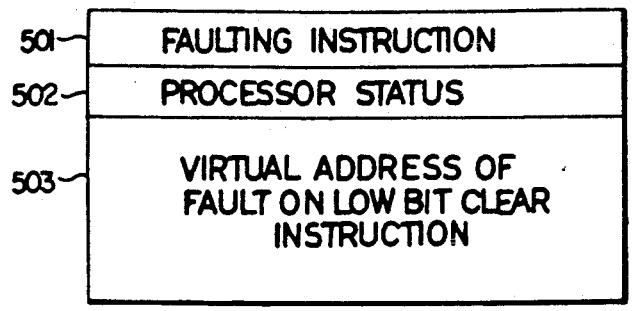
FIG. 5A illustrates the information placed on the data processing system stack in response to an exception condition permitting identification of the exception producing condition.

Referring next to FIG. 5A, when the fault condition is signaled, the data processing system mechanism (e.g., implemented in apparatus or in a special operating mode in the preferred embodiment) responsive to the fault condition stores information in the data processing unit stack that permits a control program routine to localize the source of the array reference error. In the preferred embodiment, the faulting instruction 501 is stored in one field (to preserve encoded information concerning the fault that is included in the instruction itself in the preferred embodiment), the processor status is stored in field 502 and the virtual address of the fault on low bit (clear) instruction is stored in field 503. The processor status field includes status information such as interrupt level, vector instruction enable signal, the vector restart frame, the currently executing mode of operation signal and a virtual machine monitor field.

Figure 5B:
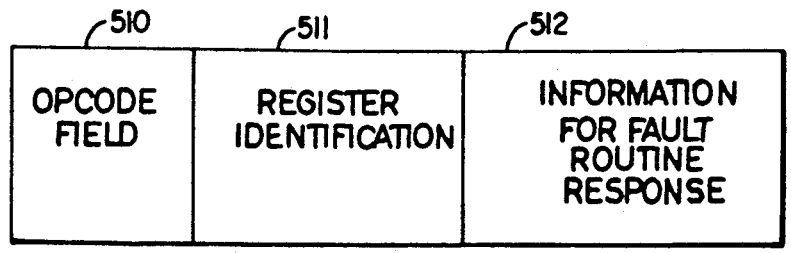
FIG. 5B is an illustrative format for the FLBC instruction.

Referring to FIG. 5B, an exemplary format for the Fault on Low Bit Clear instruction is shown. In field 510, the opcode field identifies (to the issue unit 22) the instruction (for example, Fault on Low Bit Clear) to be executed. In response, the issue unit 22 activates the apparatus to execute the instruction. Field 511 specifies to the issue unit 22 the register for which the Boolean condition (for example, low bit clear) is to be examined. Field 512 provides information that permits the data processing system to respond to the specific fault condition signaled by the instruction, such as an address.

Figure 6:
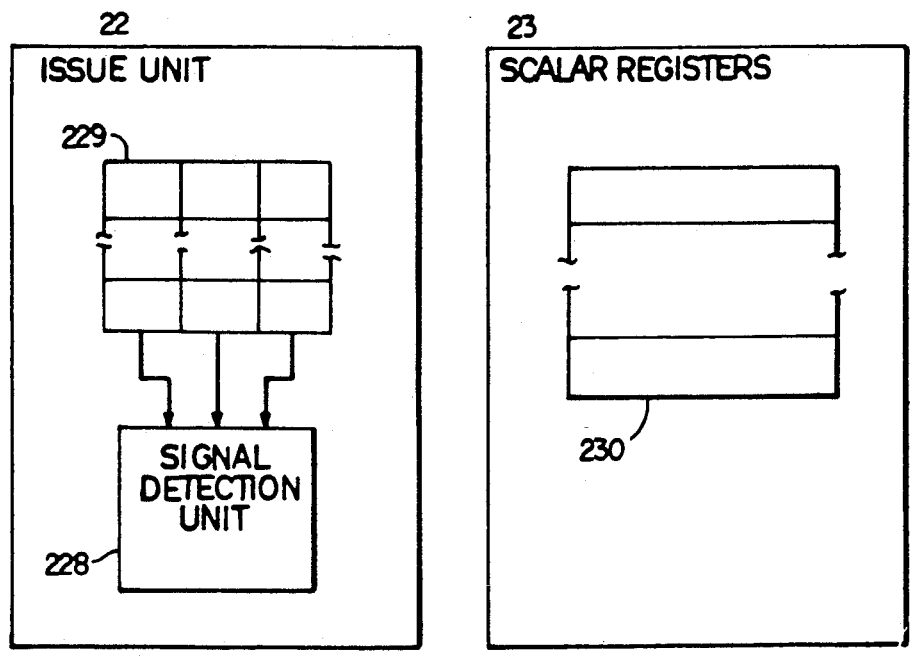
FIG. 6 illustrates the apparatus used to identify the condition signal.

Referring to FIG. 6, the preferred embodiment for an apparatus for detecting the condition signal is illustrated. Associated with each scalar register in the scalar register bank 230 of scalar register unit 23 is a three bit summary register in register bank 229 in issue unit 22. The three bits include a bit position indicating that the associated register in register bank 230 has all zeros stored therein. The second bit position indicates the sign of the data in the associated register. And the third bit position is the same bit value stored in the least significant register position in the associated register in register bank 230. A signal detection unit 228 is provided so that any of the bit positions of the associated summary register can be interrogated. Thus, in response to an instruction, such as Fault on Low Bit Clear, the signal in the identified register can be identified and the fault condition signaled when appropriate.

2. Operation of the Preferred Embodiment

The central processing unit having pipelined execution units of FIG. 2 was implemented in the preferred embodiment subject to several constraints, however, other design implementations can utilize the present invention. The central processing unit includes a plurality of execution units, each execution unit adapted to execute a class of instructions. By way of example, one execution unit, the scalar address generating unit 24, controls the transfer of the logic signal groups between the central processing unit and the main memory unit, i.e., executes the scalar load/store instructions. One execution unit is adapted to execute data shifting operations, one execution unit for floating point add/subtract operations, one execution unit is adapted for integer and floating point multiply operations and one execution unit is adapted for integer and floating point divide operations. The specialized execution units can be, but are not necessarily implemented in a pipelined configuration. The other features of the central processing unit are the following. The instruction in the currently executing sequence of instructions is transferred to the issue unit 22 from the instruction cache memory unit 21. In the issue unit, the instruction is broken down into its constituent parts and data-dependent control signals and address signals are generated therefrom. However, before an instruction can begin execution (i.e., be issued), several constraints must be satisified. All source and destination registers for the instruction must be available, i.e., no write operations to a needed register can be outstanding. The register write path must be available at the future cycle in which this instruction will store the processed quantity. The execution unit to be required for processing the instruction during the execution must be available to perform the operation. With respect to the vector operation unit, a vector operation reserves an execution unit for the duration of the vector operation. When a memory load/store instruction experiences a cache memory unit miss, the load/store unit busy flag will cause the subsequent load/store instructions to be delayed until the cache memory miss response is complete. When an instruction does issue, the destination register and the write path cycle for the result are reserved. During operand set-up, all instruction-independent register addresses are generated, operands are read and stored, and data-dependent control signals are generated. The instruction operands and control signals are passed to the associated execution unit for execution. The result generated by the execution unit is stored in the register files or in the data cache memory unit 27 as appropriate. Once an instruction issues, the result of the processing may not be available for several machine cycles. Meanwhile, in the next machine cycle, the next instruction can be decoded and can be issued when the requisite issue conditions are satisfied. Thus, the instructions are decoded and issued in the normal instruction sequence, but the results can be stored in a different order because of the of the varying instruction execution times of the execution units. This out of order storing complicates the exception handling and the retry of failing instructions. However, these events are relatively rare and the out of order storing provides execution and hardware advantages.

In comparing FIG. 3 and FIG. 4, the first two steps 301 and 302 of FIG. 3 are the same as the first two steps 401 and 402 of FIG. 4. In the prior art, step 303 required that a logical comparison be made of the low bit position of the specified register and a reference value. Such activity typically involves a conditional branch around a subroutine call, thereby disrupting the efficient sequential flow of instruction execution. Conditional branch procedures impose a large performance penalty on high performance data processing systems. By comparison, the FLBC instruction checks for the presence of a fault condition, and the next sequential instruction can be executed without delay when a fault condition is not present. The presence of a fault condition identified by this instruction causes the control program to store information on the stack that will permit the exception handling program to identify the origin of a fault condition.

This type of instruction, i.e., the Fault on Low Bit Clear instruction, can also be be used to check the program execution status, when used in conjunction with programming conventions. When a program executes correctly, a Boolean value of true (i.e., '1') is returned, and a Boolean value of false (i.e., '0') when an error is discovered. The error status can be checked by a Fault on Low Bit Clear instruction.

In the preferred embodiment, the execution units separately provide the status signals (from step 403) to associated status or summary registers 229 at the same time that the full quantities are being returned to the scalar registers 23. The summary registers permit more expeditious determination of the signal stored in the specified position of the specified register.

It will be clear to those skilled in the art that, although the low bit position of the specified register is used in the FLBC instruction, any specified register position can be used to communicate the condition information and can signal a fault condition. It will also be clear that this basic mechanism can be used to implement similar functions, such as a Fault on Register Equal to Zero condition or a Fault on Register Negative condition.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A method of controlling a processor in a digital data processing system as it is processing instructions in an instruction stream, comprising the steps of:
   generating, during processing of an instruction in said instruction stream, a condition flag indicating whether a fault condition exists and storing said condition flag in a predetermined location in data storage of said processor;
   executing, following generation of said condition flag, a fault instruction which tests the condition of said condition flag and executes a fault instruction sequence in response to said condition flag indicating a fault condition, and otherwise executing the next instruction in said instruction stream in response to another condition of said condition flag.

2. A method as defined in claim 1 in which the executing step includes the step, following testing of the condition of the condition flag and prior to execution of a fault instruction sequence, of storing a fault frame on a stack for use in identifying the condition.

3. A method as defined in claim 2 in which said fault frame storing step includes the steps of storing an address pointing to said instruction, storing a processor status identification, and storing an address of an instruction which conditioned the condition flag.

4. A digital data processor for processing instructions in an instruction stream, instructions comprising said instruction stream including a condition instruction type and a fault instruction, said processor including:
   A. condition instruction execution means for generating, during processing of an instruction in said instruction stream of said condition instruction type, a condition flag indicating whether a fault condition exists and storing said condition flag in a predetermined location in data storage of said processor;
   B. fault instruction execution means responsive to a subsequent fault instruction for testing the condition of said condition flag and executing a fault instruction sequence in response to said condition flag indicating a fault condition, and otherwise enabling said processor to execute the next instruction in said instruction stream in response to another condition of said condition flag.

5. A processor as defined in claim 4 in which the fault instruction execution means, stores a fault frame on a stack for use in identifying the condition following testing of the condition of the condition flag and prior to execution of a fault instruction sequence.

6. A processor as defined in claim 5 in which said fault frame includes an address pointing to said instruction, storing a processor status identification, and storing an address of an instruction which conditioned the condition flag.

7. A processor as defined in claim 4 further including a plurality of registers, a predetermined one of said registers including said condition flag, said condition instruction execution means conditioning a predetermined bit in said predetermined register, and said fault instruction execution means testing said predetermined bit in said predetermined register to determine whether a fault condition exists.

8. A processor as defined in claim 4 further including (i) a plurality of registers, a predetermined one of said registers including said condition flag, said condition instruction execution means conditioning a predetermined bit in said predetermined register, and (ii) a summary register for at least said predetermined register including a selected bit identifying the condition of said predetermined bit, and said fault instruction execution means testing said selected bit in said summary register to determine whether a fault condition exists.

9. A method of controlling a processor in a digital data processing system as it is processing instructions in an instruction stream, comprising the steps of:
   A. generating, during processing of an instruction in said instruction stream, a condition flag indicating whether a fault condition exists and storing said condition flag in a predetermined location in said processor;
   B. executing, following generation of said condition flag, a fault instruction which tests the condition of said condition flag, and:
      i. in response to said condition flag indicating a fault condition:
         a. storing a fault frame on a stack for use in identifying the condition including the steps of:

I. storing an address pointing to said instruction on said stack;
II. storing a processor status identification on said stack; and
III. storing an address of an instruction which conditioned the condition flag on said stack; and
    b. executes a fault instruction sequence;
  ii. and otherwise executes the next instruction in said instruction stream in response to another condition of said condition flag.

10. A digital data processor for processing instructions in an instruction stream, instructions comprising said instruction stream including a condition instruction type and a fault instruction, said processor including:
    A. a plurality of registers
    B. condition instruction execution means for generating, during processing of an instruction in said instruction stream of said condition instruction type, conditioning a predetermined bit in a predetermined one of said registers to thereby indicating whether a fault condition exists;
    C. fault instruction execution means responsive to a subsequent fault instruction which tests the condition of said condition flag, including:
        i. fault condition means for testing said predetermined bit in said predetermined register to determine whether a fault condition exists, said fault condition means being responsive to said condition flag indicating a fault condition including:
            a. stack store means for storing a fault frame on a stack for use in identifying the condition including:
                I. means for storing an address pointing to said instruction on said stack;
                II. means for storing a processor status identification on said stack; and
                III. means for storing an address of an instruction which conditioned the condition flag on said stack; and
            b. means for executing a fault instruction sequence after said stack store means has stored said fault frame on said stack; and
        ii. next instruction execution means for executing the next instruction in said instruction stream in response to another condition of said condition flag.

11. A method of controlling a processor in a digital data processing system as it is processing instructions in an instruction stream, comprising the steps of:
    generating, during processing of an instruction in said instruction stream referencing an address, a condition flag indicating whether the referenced address is outside a predetermined range and that therefore a fault condition exists, and storing said condition flag in a predetermined location in said processor;
    executing, following generation of said condition flag, a fault instruction which tests the condition of said condition flag and executes a fault instruction sequence in response to said condition flag indicating a fault condition, and otherwise executing the next instruction in said instruction stream in response to another condition of said condition flag.

12. A method as defined in claim 11 in which the executing step includes the step, following testing of the condition of the condition flag and prior to execution of a fault instruction sequence, of storing a fault frame on a stack for use in identifying the condition.

13. A method as defined in claim 12 in which said fault frame storing step includes the steps of storing an address pointing to said instruction, storing a processor status identification, and storing an address of an instruction which conditioned the condition flag.

14. A digital data processor for processing instructions in an instruction stream, instructions comprising said instruction stream, said processor including:
    A. condition instruction execution means for generating, during processing of an instruction in said instruction stream referencing an address, a condition flag indicating whether the referenced address is outside a predetermined range, a condition flag indicating whether a fault condition exists and storing said condition flag in a predetermined location in said processor;
    B. fault instruction execution means responsive to a subsequent fault instruction for testing the condition of said condition flag and executing a fault instruction sequence in response to said condition flag indicating a fault condition, and otherwise enabling said processor to execute the next instruction in said instruction stream in response to another condition of said condition flag.

15. A processor as defined in claim 14 in which the fault instruction execution means, stores a fault frame on a stack for use in identifying the condition following testing of the condition of the condition flag and prior to execution of a fault instruction sequence.

16. A processor as defined in claim 15 in which said fault frame includes an address pointing to said instruction, storing a processor status identification, and storing an address of an instruction which conditioned the condition flag.

17. A processor as defined in claim 14 further including a plurality of registers, a predetermined one of said registers including said condition flag, said condition instruction execution means conditioning a predetermined bit in said predetermined register, and said fault instruction execution means testing said predetermined bit in said predetermined register to determine whether a fault condition exists.

18. A processor as defined in claim 14 further including (i) a plurality of registers, a predetermined one of said registers including said condition flag, said condition instruction execution means conditioning a predetermined bit in said predetermined register, and (ii) a summary register for at least said predetermined register including a selected bit identifying the condition of said predetermined bit, and said fault instruction execution means testing said selected bit in said summary register to determine whether a fault condition exists.

19. A method of controlling a processor in a digital data processing system as it is processing instructions in an instruction stream, comprising the steps of:
    A. generating, during processing of an instruction in said instruction stream referencing an address, a condition flag indicating whether the referenced address is outside a predetermined range and that therefore a fault condition exists, and storing said condition flag in a predetermined location in said processor;
    B. executing, following generation of said condition flag, a fault instruction which tests the condition of said condition flag, and:
        i. in response to said condition flag indicating a fault condition:

a. storing a fault frame on a stack for use in identifying the condition including the steps of:
  I. storing an address pointing to said instruction on said stack;
  II. storing a processor status identification on said stack; and
  III. storing an address of an instruction which conditioned the condition flag on said stack; and
b. executes a fault instruction sequence;
ii. and otherwise executes the next instruction in said instruction stream in response to another condition of said condition flag.

20. A digital data processor for processing instructions in an instruction stream, instructions comprising said instruction stream including a condition instruction type and a fault instruction, said processor including:
  A. a plurality of registers
  B. condition instruction execution means for generating, during processing of an instruction in said instruction stream referencing an address, a condition flag indicating whether the referenced address is outside a predetermined range, a condition flag indicating whether a fault condition exists and storing said condition flag in a predetermined location in said processor;
  C. fault instruction execution means responsive to a subsequent fault instruction which tests the condition of said condition flag, including:
    i. fault condition means for testing said predetermined bit in said predetermined register to determine whether a fault condition exists, said fault condition means being responsive to said condition flag indicating a fault condition including:
      a. stack store means for storing a fault frame on a stack for use in identifying the condition including:
        I. means for storing an address pointing to said instruction on said stack;
        II. means for storing a processor status identification on said stack; and
        III. means for storing an address of an instruction which conditioned the condition flag on said stack; and
      b. means for executing a fault instruction sequence after said stack store means has stored said fault frame on said stack; and
    ii. next instruction execution means for executing the next instruction in said instruction stream in response to another condition of said condition flag.

* * * * *